US012600160B2

(12) United States Patent
Calmet et al.

(10) Patent No.: US 12,600,160 B2
(45) Date of Patent: Apr. 14, 2026

(54) PERSONALIZABLE SECURITY DOCUMENT AND METHOD OF MANUFACTURING THE SAME

(71) Applicant: Toppan Security SAS, Paris (FR)

(72) Inventors: Arnaud Calmet, Fanjeaux (FR); Mathieu Loncle, Bordeaux (FR); Nipun Sharma, Suresnes (FR)

(73) Assignee: Toppan Security SAS, Paris (FR)

( * ) Notice: Subject to any disclaimer, the term of this patent is extended or adjusted under 35 U.S.C. 154(b) by 0 days.

(21) Appl. No.: 18/925,361

(22) Filed: Oct. 24, 2024

(65) Prior Publication Data

US 2025/0153500 A1 May 15, 2025

(30) Foreign Application Priority Data

Nov. 9, 2023 (EP) .................................... 23315413

(51) Int. Cl.

*B42D 25/41* (2014.01)
*B42D 25/30* (2014.01)
*B42D 25/435* (2014.01)
*B42D 25/45* (2014.01)

(52) U.S. Cl.

CPC ............. *B42D 25/30* (2014.10); *B42D 25/41* (2014.10); *B42D 25/435* (2014.10); *B42D 25/45* (2014.10)

(58) Field of Classification Search

CPC .............................. B42D 25/41; B42D 25/435
See application file for complete search history.

(56) References Cited

U.S. PATENT DOCUMENTS

2013/0344298 A1* 12/2013 Haas ...................... B42D 25/00 524/106
2017/0144468 A1* 5/2017 Kaizuka ............... B42D 25/425
2019/0283482 A1* 9/2019 Zernicek ................ B42D 25/41
(Continued)

FOREIGN PATENT DOCUMENTS

EP 4094952 11/2022
EP 4094952 A1 11/2022
EP 4155093 3/2023
(Continued)

OTHER PUBLICATIONS

"European Application Serial No. 23315413.7, Extended European Search Report mailed Apr. 2, 2024", 5 pgs.

*Primary Examiner* — Kyle R Grabowski
(74) *Attorney, Agent, or Firm* — Schwegman Lundberg & Woessner, P.A.

(57) ABSTRACT

A personalizable security document including a combination of two secure features, namely, a laser-engravable material embedded in a substrate of the security document and an embossed pattern formed in an outer surface of the substrate and overlapping the laser-engravable material. The combination of the laser-engravable material and the embossed pattern may result in a change in appearance of the embossed pattern when the security document is viewed at different observation angles. Security can be further enhanced by providing a watermark below the laser-engravable material. Further, by providing appropriate structures in the embossed pattern and the laser-engravable material, a personalized security document exhibiting a moiré effect can be obtained.

19 Claims, 7 Drawing Sheets

(56) References Cited

U.S. PATENT DOCUMENTS

| | | | | |
|---|---|---|---|---|
| 2023/0011918 | A1* | 1/2023 | Pohjola .................. | G02B 30/56 |

FOREIGN PATENT DOCUMENTS

| | | | |
|---|---|---|---|
| EP | 4155093 | A1 | 3/2023 |
| GB | 2584552 | | 12/2020 |
| GB | 2584552 | A | 12/2020 |
| WO | WO-2022248309 | A1 | 12/2022 |

* cited by examiner

PERSONALIZABLE SECURITY DOCUMENT AND METHOD OF MANUFACTURING THE SAME

CROSS-REFERENCE TO RELATED APPLICATION(S)

This application claims priority to European Patent Appl. No. 23315413.7, titled "Personalizable Security Document and Method of Manufacturing the Same," filed Nov. 9, 2023, which is incorporated herein by reference in its entirety.

TECHNICAL FIELD

The present disclosure generally relates to security features for security documents, in particular, personalizable security documents such as identification documents, driver's licenses and the like.

BACKGROUND

Generally, in the market of physical identification documents, a variety of different security features are used to ensure the document's security and integrity. In some applications, a laser-engraved image is considered vital, as the image features are generated inside a polycarbonate substrate rather than on the surface of the substrate making it more difficult to tamper with the document. A laser-engraved feature in a polycarbonate substrate may include a black and white (in particular, grayscale) image, a color image, or special features like the HID Mirage™ security feature of HID Global Corporation.

WO 2022/248309 A1 discloses a personalizable security document including a combination of a plurality of different features. In particular, a laser-engraved image is provided in a first layer of the security document, and one or more fluorescent inks are provided in further layers of the same. A laser-engraving of the image is performed from a first side of the substrate, such that patterns formed by the fluorescent inks are not affected. Under white light, the laser-engraved image can be viewed from the first side, whereas a multicolor fluorescence of the patterns can be observed from a second side under UV light.

The present disclosure is directed, at least in part, to improving or overcoming one or more aspects of prior systems, without being limited to a particular type of security document.

SUMMARY OF THE DISCLOSURE

According to one aspect of the present disclosure, a personalizable security document comprises a substrate having a first side and a second side opposite to the first side in a thickness direction of the substrate, and a security feature formed in the substrate and extending through at least part of the substrate along the thickness direction. The security feature includes a laser-engravable material configured to have a personalized image laser engraved in the same. The laser-engravable material exhibits a color-change effect upon irradiation with laser light. The laser-engravable material is embedded in the substrate and is visible when the substrate is viewed from the first side under white light. The security feature further includes an embossed pattern formed in an outer surface of the substrate on the first side. The embossed pattern overlaps the laser-engravable material and is visible when the substrate is viewed from the first side under white light.

In another aspect of the present disclosure, a method of manufacturing a personalizable security document comprises the steps of providing a plurality of layers, applying a laser-engravable material on a surface of a first layer of the plurality of layers, the laser-engravable material exhibiting a color-change effect upon irradiation with laser light, arranging at least one second layer of the plurality of layers on the surface of the first layer, laminating the first layer and the at least one second layer to form a substrate, and embossing an embossed pattern in an outer surface of an outermost layer of the at least one second layer. The embossed pattern overlaps the laser-engravable material when viewed in a direction perpendicular to the surface of the first layer. In an example embodiment, and perhaps preferably, the embossing is performed in the step of laminating the first layer and the at least one second layer.

In a further aspect of the present disclosure, a method of personalizing a security document comprises providing a personalizable security document in accordance with the above aspect, wherein the embossed pattern includes a regular pattern adapted to form a moiré pattern in combination with a further regular pattern, laser-engraving a personalized image in the laser-engravable material by varying one or more laser parameters, and laser-engraving a further regular pattern in the laser-engravable material to form a moiré pattern in combination with the first regular pattern. Optionally, the moiré pattern may result in that the personalized image is visible when the security document is viewed from the first side under white light at a first observation angle, and is obscured at least in part when the security document is viewed from the first side under white light at a second observation angle.

Other features and aspects of the present disclosure will be apparent from the following description and the accompanying drawings.

DETAILED DESCRIPTION

Figure 1:
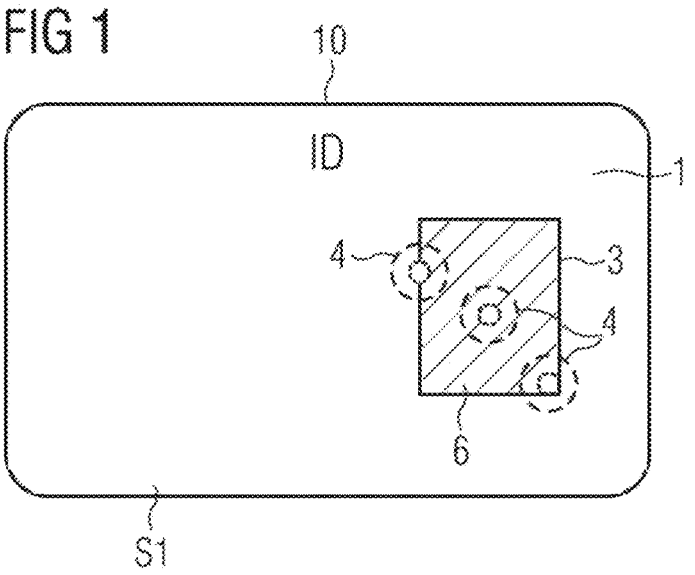
FIG. 1 shows a plan view of an example personalizable security document in accordance with the present disclosure.

The following is a detailed description of example embodiments of the present disclosure. The example embodiments described herein are intended to teach the principles of the present disclosure, enabling those of ordinary skill in the art to implement and use the present disclosure in many different environments and for many different applications. Therefore, the example embodiments are not intended to be, and should not be considered as, a limiting description of the scope of protection. Rather, the scope of protection shall be defined by the appended claims.

The present disclosure is based at least in part on the realization that the security of a secondary portrait formed in a window of a security document can be increased by combining two different security features, namely, a laser-engraved personalized image formed inside a substrate of the security document, and an embossed feature formed in an outer surface of the security document, at a position that corresponds to the personalized laser-engraved image.

It has been realized that, especially when the material that forms the laser-engravable layer includes metallic particles such as Al and Ag particles, as in the HID Mirage™ security feature of HID Global Corporation, this can be combined with the embossed structure in the outer surface of the document in an advantageous manner to achieve a change in the appearance of the embossed feature when the document is viewed at different observation angles, for example, in reflection or in transmission. In other words, the optical properties of the metallic particles in the laser-engravable material create or enhance at least some of the optical effects that are achieved by the embossing of the pattern. As the two different features are linked to each other, it becomes more difficult to forge the security document, because the combined effect of the two features has to be replicated.

The present disclosure is also based at least in part on the realization that a watermark can be used in combination with the above-mentioned two security features to further increase the security. Such a watermark can be provided underneath the laser-engravable material, and can be observed when the security document is viewed in transmission together with the embossed pattern, while the laser-engraved image cannot be seen. This creates a further link between two secure features, namely, the watermark and the embossed pattern.

The present disclosure is also based at least in part on the realization that the security can be increased even further by providing a moiré pattern, by appropriately configuring the embossed pattern formed in the outer surface of the security document and the laser-engraved image. Advantageously, this moiré pattern can result in that the personalized image is visible when the document is viewed under white light at a first observation angle, and is hidden when the document is viewed under white light at a second observation angle. As the two patterns that create the moiré pattern are linked to each other, any attempt to manipulate the security document by modifying one of the two security features may result in that the moiré pattern and its associated effect is no longer observed. In this manner, a potential fraud can be detected.

It has also been realized that the personalizable security document disclosed herein can be manufactured in an advantageous manner by applying the embossing during manufacturing of the security document, in particular, while laminating the different layers of the same. To achieve this, properly configured lamination plates can be used, which impart the desired embossed patterns. Here, it has been realized that the embossed patterns can be provided on both sides of the security document, in other words, both lamination plates used for the lamination process can include corresponding structures that create embossed patterns on opposite sides of the security document when laminating the same. By providing embossed patterns on both sides of the security document, the security can be even further increased.

FIG. 1 shows a plan view of an example personalizable security document 10 in accordance with the present disclosure. As shown in FIG. 1, security document 10 includes a substrate 1, for example, having a substantially rectangular shape. In particular, as shown in FIG. 1, security document 10 is a personalizable security document, i.e., does not yet include an image, for example, a photograph or the like, of a person to which the document belongs. Such an image can be formed later, for example, in an image region provided on a first side S1 of substrate 1 in a known manner.

In addition, as shown in FIG. 1, document 10 includes a security feature 3 formed in substrate 1, which is a window having, for example, a rectangular shape and in which one or more secure features may be provided. For example, as shown in FIG. 1, security feature 3 may include a laser-engravable material 6, in which a personalized image (for example, an inverse or negative image) of the person to which the document belongs can be laser engraved. This will be described in more detail in the following.

Figure 3:
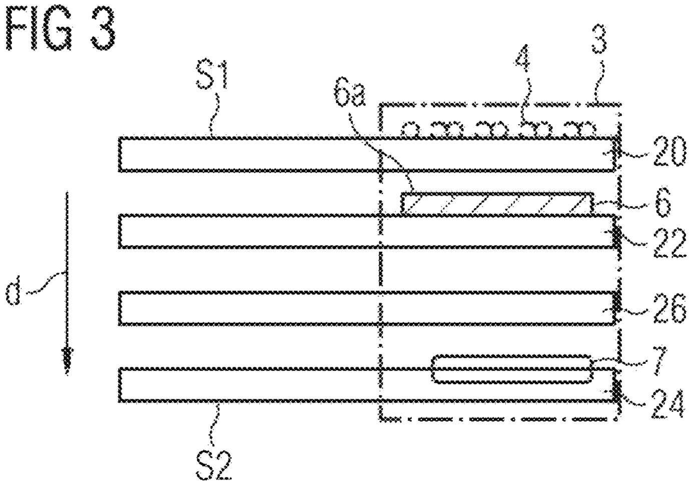
FIG. 3 shows a security feature provided in a personalizable security document in accordance with a first embodiment of the present disclosure.

FIG. 3 shows a schematic cross-sectional view of personalizable security document 10. As shown in FIG. 3, personalizable security document 10 comprises substrate 1 having first side S1 and a second side S2 opposite to first side S1 in a thickness direction d of substrate 1. For example, substrate 1 may be formed by stacking a plurality of layers, for example, polycarbonate, TPU and/or PVC layers, and combining them in an appropriate manner, for example, by a lamination process or the like. This will also be described in more detail in the following.

Security feature 3 is formed in substrate 1 and extends through at least part of substrate 1 along thickness direction d. In the example shown in FIG. 3, security feature 3 extends from an uppermost layer 20 to a bottom layer 24 of substrate 1. In some embodiments, at least the portion of each layer in which security feature 3 is formed is substantially transparent or at least semi-transparent for visible light, such that laser-engravable material 6 is visible at least from first side S1 of security document 10 under white light.

As shown in FIG. 3, laser-engravable material 6 may be formed as a material layer on one of the layers forming substrate 1 of security document 10. For example, an ink may be applied onto a surface of a first layer 22 of substrate 1, for example, prior to laminating the different layers of substrate 1 to form security document 10. In other embodiments, laser-engravable material 6 may be formed in a different manner, either on a layer of substrate 1, or in a layer of the same. In any case, laser-engravable material 6 has a predetermined thickness in thickness direction d, for example, between 1 μm and 100 μm, preferably, between 10 μm and 50 μm.

The material of laser-engravable material 6 has a property such that laser-engravable material 6 exhibits a color-change effect upon irradiation with laser light. As used herein, the "color-change effect upon irradiation with laser light" means that laser light that is irradiated onto laser-engravable material 6 changes at least one physical property of, for example, particles or pigments included in laser-engravable material 6 in a predetermined manner, for example, depending on the intensity of the laser light, and/or other laser parameters. One particular example is the ink that is used in the HID Mirage™ security feature of HID Global Corporation. In this technology, each pixel in a laser-engraved personalized image 5 (see FIGS. 4 and 5) has a defined color value, depending, for example, on a digital grayscale value of a grayscale image to be engraved. For example, a color value of blue corresponds to white in the digital grayscale image to be engraved, and a color value of gold corresponds to black in the digital grayscale image to be engraved. This means that, for example, a minimum or zero laser power results in that laser-engravable material 6 remains of an initial blue color, whereas increasing laser power results in a color change from the initial blue color towards a golden color at maximum laser power. In between the minimum and the maximum laser power, a color-change can be observed from blue to gold. In this manner, for example, a grayscale portrait of a holder of security document 10, for example, a negative or positive image, can be formed in a first surface 6*a* of laser-engravable material 6.

Here, it will be appreciated that the present application is not limited to the Mirage ink described above, and can be applied to any known laser-engravable material that exhibits a color-change effect when irradiated with laser light. However, it is important to note that the color-change effect as described herein is different from a change that is obtained when a physical structure of a material layer such as a transparent PVC layer or the like is modified by being burnt using a laser having a certain power. It will be appreciated that in such a manner a grayscale image can be formed in a top layer of substrate 1, however, such a formation of a grayscale image by burning of the material of the layer is not to be understood as exhibiting a color-change effect in accordance with the present disclosure. Accordingly, as used herein, a material that exhibits a color-change effect is to be considered a material which changes its color from a first, in particular, chromatic color (for example, blue) to a second, different color (for example, golden), and a change from, for example, colorless to gray or black due to burning of material with increasing laser power is not to be considered as a color-change effect.

Returning to FIG. 3, laser-engravable material 6 is formed on first layer 22 of substrate 1. For example, the above-mentioned laser-engravable ink may be formed on a top surface of first layer 22, for example, by screen printing or the like. It will be appreciated, however, that in other embodiments laser-engravable material 6 may be formed on a bottom surface of first layer 22, or on another layer of substrate 1. Additionally, first layer 22 is covered by one or more second layers 20, including, for example, a protective layer or the like. The stack of layers of substrate 1 is configured such that personalized image 5 can be laser-engraved in laser-engravable material 6 from first side S1 using an appropriately configured laser, as will be described in more detail below. It will be appreciated that, in particular, as first layer 22 is covered by one or more additional layers, said additional layers are transparent for the laser light, and the laser parameters are controlled such that the material of the additional layers is not visibly modified (i.e. burned) by the laser.

Figure 2:
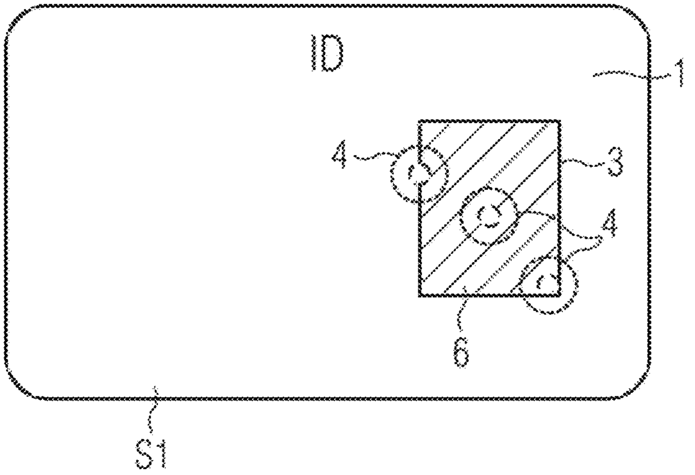
FIG. 2 shows another plan view of the personalizable security document in accordance with the present disclosure.

As shown in FIGS. 1 to 3, security feature 3 further includes an embossed pattern 4 formed in an outer surface of substrate 1 on first side S1. Embossed pattern 4 overlaps laser-engravable material 6 and is visible when substrate 1 is viewed from first side S1 under white light. In other words, embossed pattern 4 is arranged such that it overlaps laser-engravable material 6 when substrate 1 is viewed along thickness direction d. Embossed pattern 4 may be formed in the outer surface of substrate 1 in any known manner, for example, during a process of laminating the plurality of layers forming substrate 1.

In some embodiments, embossed pattern 4 is configured such that an appearance of the same changes when substrate 1 is viewed from first side S1 under white light (i.e., in reflection) at different observation angles. It will be readily appreciated that such a property of embossed pattern 4 can be obtained by appropriately configuring the microscopic structures of embossed pattern 4 (for example, depths of depressions, heights of peaks, distances between adjacent depressions/peaks, lattice constants of embossed structures such as grids, etc.), such that desired reflective, diffractive or refractive properties, which result in a change of the appearance of the observed pattern depending on the observation angle, are obtained. In this manner, as shown in FIGS. 1 and 2, embossed pattern 4 may have a first appearance when substrate 1 is viewed at a first observation angle from first side S1, and may have a second, different appearance when substrate 1 is viewed at a second, different observation angle from the same side under white light.

It should be appreciated that the change in appearance may have any desired configuration, for example, may include at least one of a change in color, a change in opacity, a change in reflectivity, or a change in shape (i.e., visible area) of embossed pattern 4. Typical sizes of the structures forming embossed pattern 4 are, for example, between 5 μm and 50 μm, preferably, between 10 μm and 30 μm.

Figure 6:
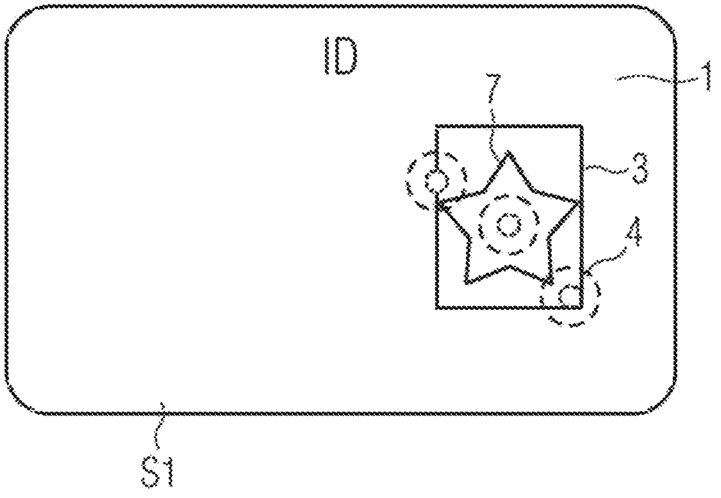
FIG. 6 shows a plan view of the example personalizable security document in accordance with the present disclosure when viewed against white light.

As shown in FIG. 3, security feature 3 may further include a watermark 7 provided in substrate 1 between laser-engravable material 6 and second side S2. For example, watermark 7 may be applied on or in bottom layer 24 of substrate 1, for example, by printing watermark 7 on a top surface of bottom layer 24, for example, by silkscreen printing, flexo printing, and the like. Watermark 7 is aligned with embossed pattern 4 (and therefore also laser-engravable material 6), and watermark 7 as well as embossed pattern 4 is visible when substrate 1 is viewed from first side S1 against white light (i.e., in transmission). This is shown, for example, in FIG. 6. The use of watermarks such as watermark 7 is well-known, such that a detailed description will be omitted. However, what is important is that watermark 7 is aligned with embossed pattern 4, resulting in a combined feature that is visible when security document 10 is viewed from first side S1 in transmission.

Figure 7:
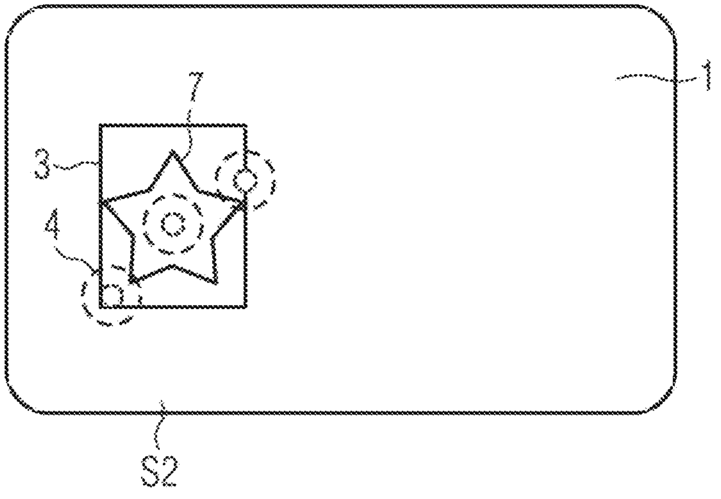
FIG. 7 shows a bottom view of an example personalizable security document in accordance with the present disclosure when viewed against white light.

As shown in FIG. 7, the above also applies when security document 10, i.e., substrate 1 is viewed from second side S2 in transmission. Also in this case, both watermark 7 and embossed pattern 4 are visible. It will be appreciated that the above also applies after personalization of security document 10, i.e., after personalized image 5 has been formed. Also in this case, when security document 10 is viewed in transmission, personalized image 5 is not visible.

FIG. 3 shows that an intermediate layer 26 is present between first layer 22 and bottom layer 24 of substrate 1, on or in which watermark 7 is provided. However, it will be appreciated that in other embodiments intermediate layer 26 can be omitted, or more than one intermediate layer 26 can be provided. Likewise, it will be appreciated that watermark 7 does not need to be formed on bottom layer 24, but can also be formed in any intermediate layers between bottom layer 24 and first layer 22, if desired.

Returning to FIGS. 1 and 2, in some embodiments, embossed pattern 4 may be configured such that an appearance of the same also changes when embossed pattern 4 is viewed from first side S1 against white light at different observation angles. In other words, the effect that is shown in FIG. 1 for the case in which security document 10 is viewed in reflection may also be present when the same is viewed from first side S1 in transmission.

Figure 4:
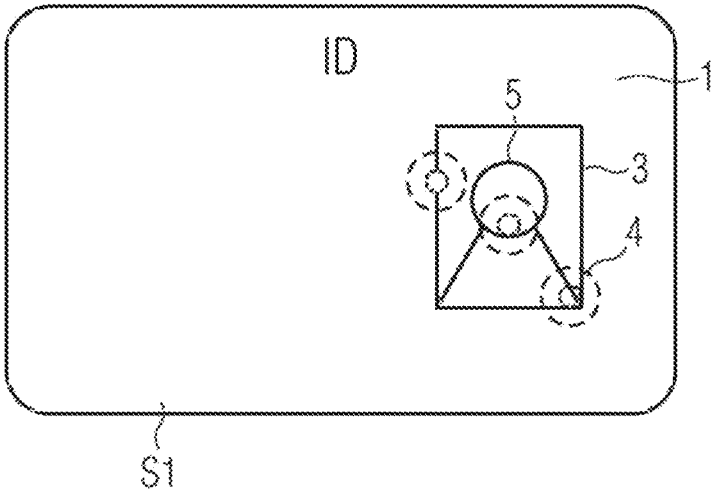
FIG. 4 shows a plan view of an example personalized security document in accordance with the present disclosure.
Figure 5:
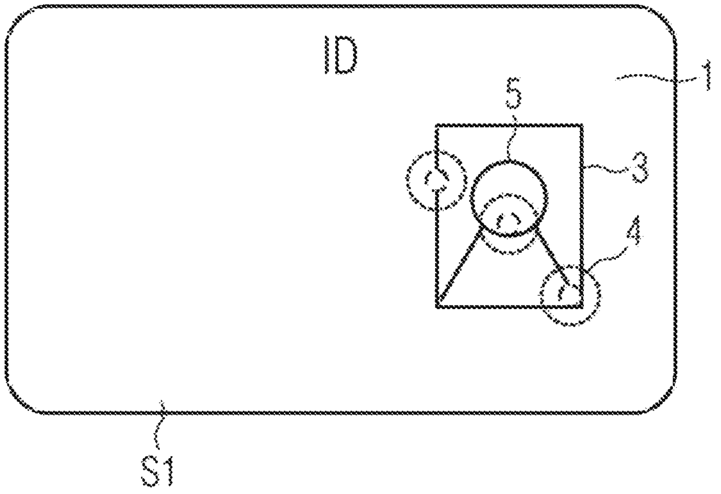
FIG. 5 shows another plan view of the example personalized security document in accordance with the present disclosure.

FIGS. 4 and 5 also show the change of appearance of embossed pattern 4 when security document 10, i.e., substrate 1 is viewed from first side S1 in reflection after personalized image 5 has been formed. Formation of personalized image 5 is achieved by irradiating laser light onto laser-engravable material 6 in the above-described manner. Here, it is important to note that, when personalized image 5 is formed, embossed pattern 4 is present in top layer 20 of substrate 1 of security document 10. Accordingly, special care has to be taken to use appropriate laser parameters in consideration of the structure of embossed pattern 4 to be able to engrave personalized image 5. For example, the wavelength of the laser light that is used has to be varied, for example, between 515 and 1030 nm, in order to not be reflected by embossed pattern 4, the speed of the laser may need to be varied in a range from, for example, between 2 to 4000 mm/s, and the repetition rate may also need to be varied between, for example, 10 and 600 kHz. Here, the skilled person will have no difficulty in selecting appropriate parameters to create personalized image 5 in consideration of the properties of embossed pattern 4 depending on the circumstances.

Figure 8:
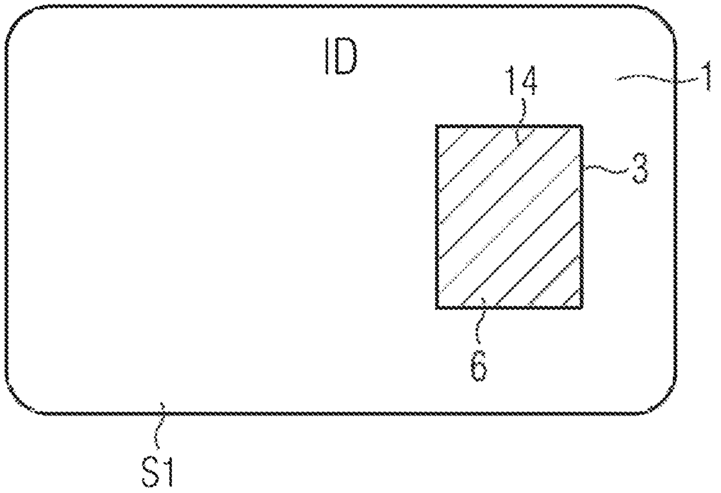
FIG. 8 shows a plan view of an example personalizable security document illustrating a regular pattern formed in a laser-engravable material.
Figure 9:
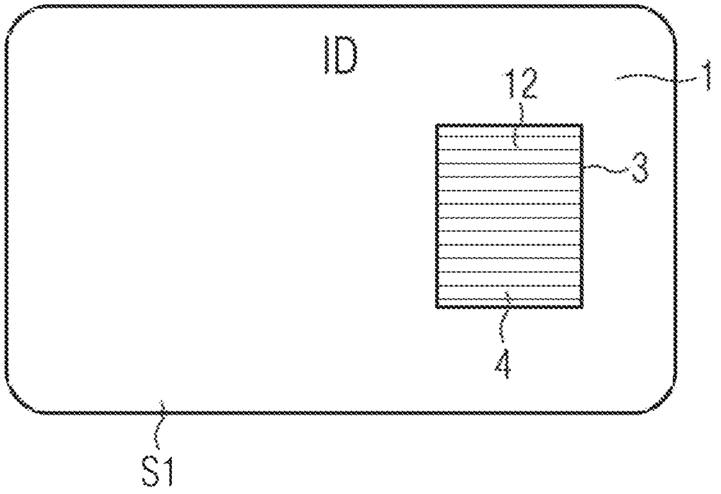
FIG. 9 shows a plan view of an example personalizable security document in accordance with the present disclosure.

A further embodiment in accordance with the present disclosure is described in the following with reference to FIGS. 8 to 15. In this further embodiment, embossed pattern 4 includes a regular pattern 12 (see FIG. 9) adapted to form a moiré pattern in combination with a further regular pattern 14, as shown in FIG. 8. Here, the skilled person knows which types of regular patterns are commonly used to form a moiré pattern. For example, regular pattern 12 may include a plurality of equidistant lines, and in some cases, and perhaps preferably, a plurality of straight lines. The plurality of straight lines can be substantially orthogonal to opposite edges of substrate 1 when viewed from first side S1, or extend at an angle with respect to said opposite edges. A distance between the lines may be between 5 μm and 500 μm, preferably, between 5 μm and 50 μm. Of course, it will be appreciated that a plurality of straight lines is only one example, and that other regular patterns can be used, for example, a plurality of concentric circles, a plurality of wavy or curved lines that extend adjacent to each other at regular intervals, a two-dimensional grid pattern, and the like. It will be appreciated that regular pattern 12 may be used in combination with other patterns or structures forming embossed pattern 4. FIG. 9 shows one example in which regular pattern 12 is formed by a plurality of straight lines extending orthogonal to opposite short sides of substantially rectangular substrate 1, at least in the area in which the window of security feature 3 is formed.

In order to achieve a moiré effect, further regular pattern 14 can be formed in laser-engravable material 6. This is schematically shown in FIG. 8. In some embodiments, simultaneously with or after forming personalized image 5 using a laser, further regular pattern 14 can be formed in laser-engravable material 6, for example, by controlling the laser in an appropriate manner to create the pattern. In other embodiments, however, further regular pattern 14 may already be formed in laser-engravable material 6 during or after manufacturing of personalizable security document 10, and may be present before engraving personalized image 5. In other words, laser-engravable material 6 may already include further regular pattern 14. In one embodiment, and perhaps preferably, laser-engravable material 6 may form further regular pattern 14, for example, by including a plurality of gaps or slots defining further regular pattern 14. This can be achieved, for example, by applying laser-engravable material 6 in an appropriate manner on first layer 22 (e.g., by not applying the material to the portions corresponding to the pattern), or by removing some of laser-engravable material 6 after application to define further regular pattern 14.

In the example shown in FIG. 8, further regular pattern 14 includes a plurality of equidistant straight lines extending at an angle with respect to the opposite edges of substrate 1. Of course, it will be appreciated that the configuration shown in FIG. 8 is only an example, and further regular pattern 14 may also be formed by a plurality of straight lines extending in the same direction as the straight lines forming regular pattern 12. Further, a spacing between the straight lines forming further regular pattern 14 may be the same as a spacing between the straight lines forming regular pattern 12, or may be slightly different. Example distances between adjacent lines may be between 5 μm and 50 μm. In any case, using appropriately configured regular patterns, a known moiré effect can be observed when security document 10 is viewed from first side S1 in reflection.

Figure 10:
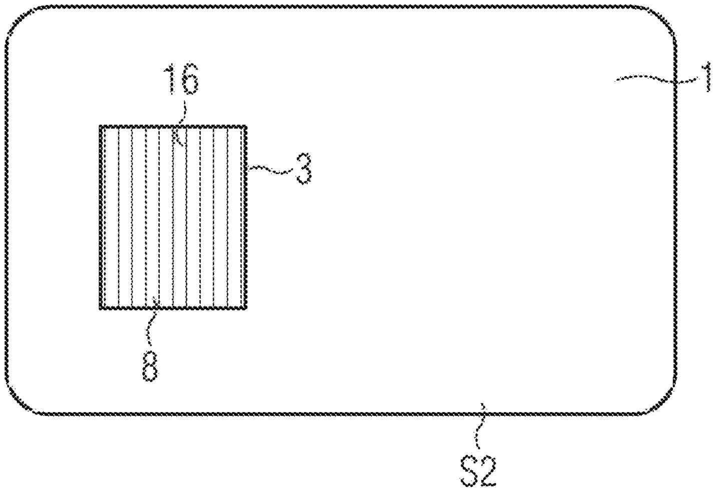
FIG. 10 shows a bottom view of the example personalizable security document in accordance with the present disclosure.
Figure 11:
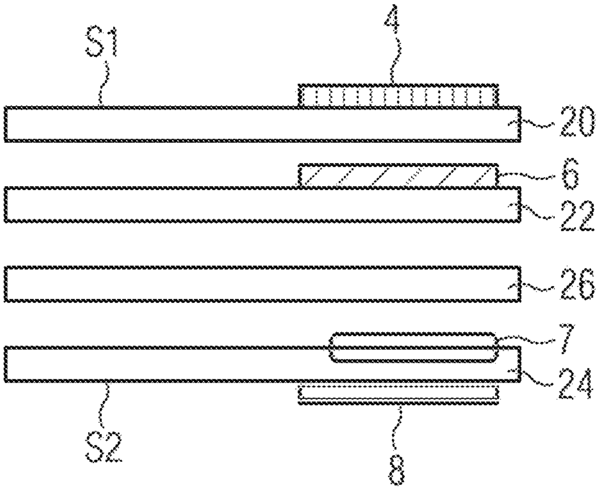
FIG. 11 shows a schematic cross-sectional view of a second embodiment of a personalizable security document in accordance with the present disclosure.

As shown in FIGS. 10 and 11, in some embodiments, security feature 3 may further include a second embossed pattern 8 formed in an outer surface of substrate 1 on second side S2. Second embossed pattern 8 may also overlap laser-engravable material 6 and may be visible when substrate 1 is viewed from second side S2 under white light. It will be appreciated that the presence of second embossed pattern 8 results in that, when substrate 1 is viewed in transmission from first side S1 or second side S2, generally both first embossed pattern 4 and second embossed pattern 8, as well as watermark 7 are visible, whereas personalized image 5 is not visible. However, also in this case, a moiré pattern can be obtained by appropriately configuring first embossed pattern 4 and second embossed pattern 8. In other words, second embossed pattern 8 may include further regular pattern 14 resulting in the moiré effect when security document 10 is viewed in transmission. Here, such a moiré effect can also be combined with watermark 7 such that, depending on an angle of observation, for example, watermark 7 is visible or at least partially obscured. In some embodiments, part of the moiré effect can be due to first embossed pattern 4, and another part of the moiré effect can be due to second embossed pattern 8.

Figure 12:
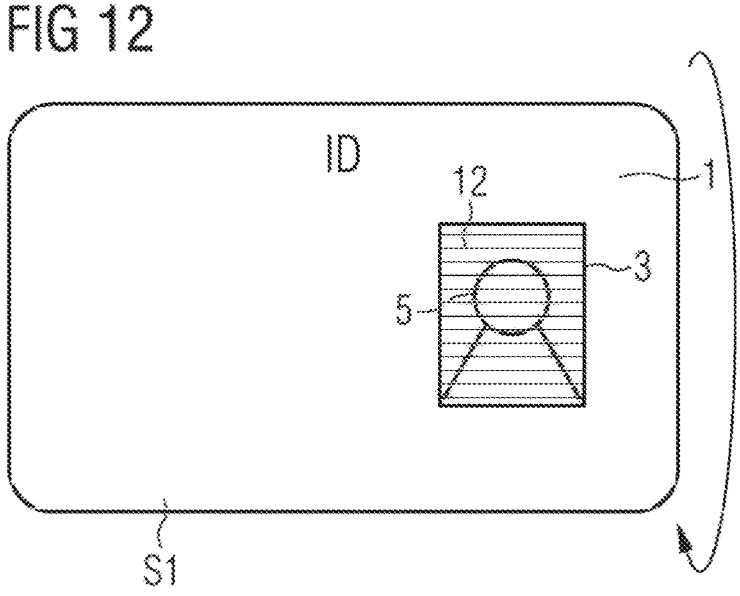
FIG. 12 shows a plan view of an example personalized security document in accordance with the present disclosure when viewed from a first side at a first observation angle.
Figure 13:
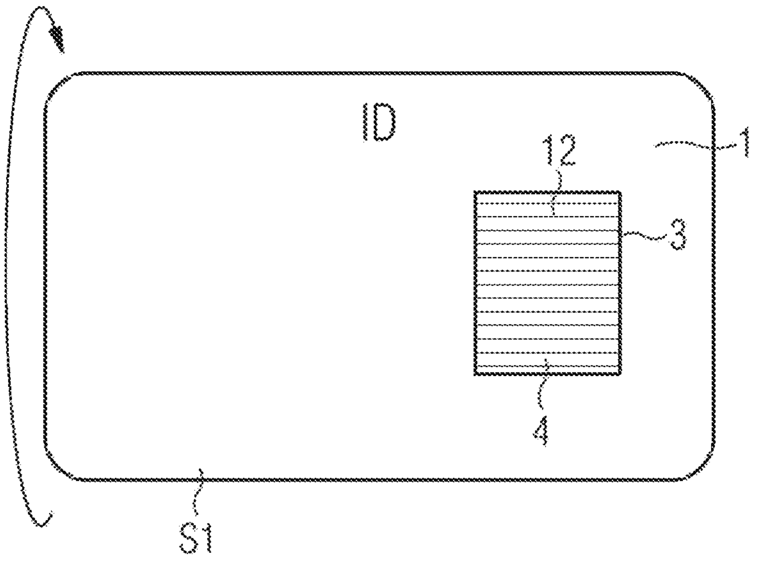
FIG. 13 shows a plan view of the example personalized security document in accordance with the present disclosure when viewed from the first side at a second observation angle.

As mentioned above, the moiré effect that is achieved by the combination of regular patterns 12 and 14, for example, formed in embossed pattern 4 and laser-engravable material 6, respectively, can be used to obscure, for example, personalized image 5 at least in part when an angle of observation of security document 10 viewed in reflection is changed. This is indicated in FIGS. 12 and 13. In FIG. 12, personalized image 5 is visible, but when changing an angle of observation, for example, by rotating substrate 1 along an axis that is parallel to the direction of extension of straight lines 12 included in embossed pattern 4, personalized image 5 is no longer visible, i.e., obscured, as shown in FIG. 13.

Figure 14:
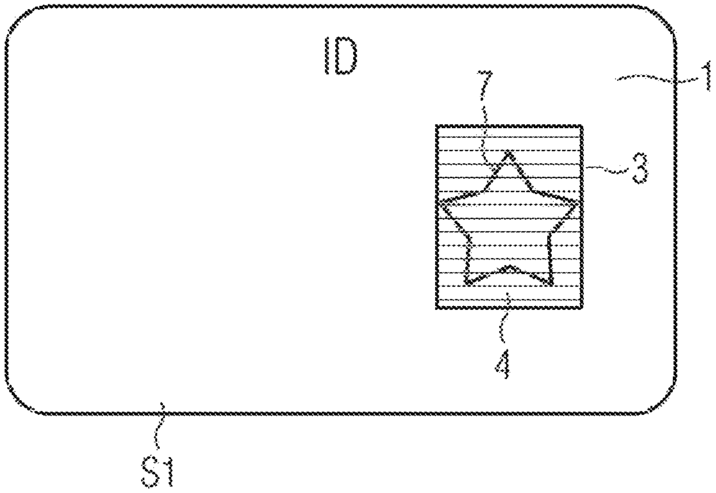
FIG. 14 shows a plan view of the example personalized security document when viewed from the first side against white light.
Figure 15:
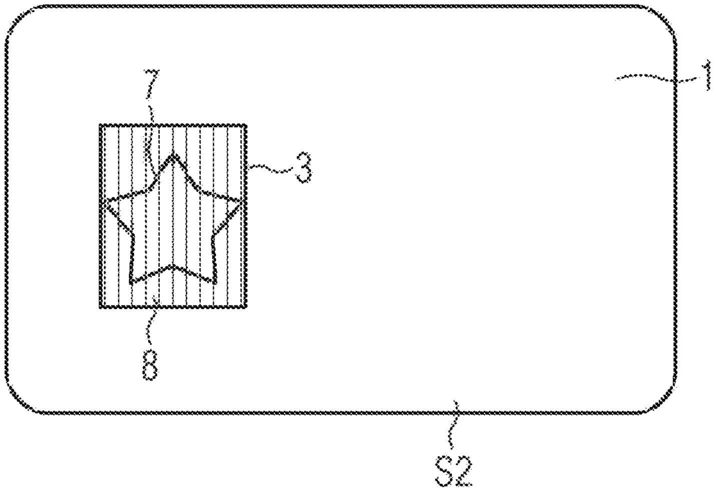
FIG. 15 shows a bottom view of the example personalized security document when viewed against white light.

On the other hand, as shown in FIGS. 14 and 15, when security document 10, i.e., substrate 1 is viewed in transmission (against white light), both from first side S1 and from second side S2, only watermark 7 and embossed pattern 4 and/or embossed pattern 8 are visible, while personalized image 5 is no longer visible.

As initially mentioned, laser-engravable material 6 may include metallic particles, for example, Al or Ag particles. The presence of such metallic particles may enhance or create the effect that is obtained with the embossing of embossed pattern 4, i.e., the change in appearance of the same when an angle of observation is changed.

As previously described, substrate 1 is formed from a plurality of laminated layers, such as the layers 20, 22, 24, 26 shown in FIG. 3 and FIG. 11. Said layers may be polycarbonate layers, with laser-engravable material 6 being provided on an inner layer 22 of substrate 1, and embossed pattern 4 being embossed in an outer layer 20 of substrate 1 on first side S1. However, it will be appreciated that the present disclosure is not limited to a substrate that is formed by a plurality of laminated layers, and may have any other appropriate configuration, as long as laser-engravable material 6 is embedded in substrate 1 and is visible when substrate 1 is viewed from first side S1 under white light, and embossed pattern 4 is formed in an outer surface of substrate 1 on first side S1.

INDUSTRIAL APPLICABILITY

With the above-described configurations, a personalizable security document 10 that combines two or more secure features, in particular, a laser-engraved personalized image 5 and an embossed pattern 4 formed in registration with personalized image 5 can be obtained.

An example method of manufacturing personalizable security document 10 is described in the following. In a first step, a plurality of layers, such as the layers 20, 22, 24, 26 shown in FIGS. 3 and 11, is provided.

In a next step, laser-engravable material 6 is applied on a surface of first layer 22 of the plurality of layers, for example, by screen printing or the like. Laser-engravable material 6 exhibits a color-change effect upon irradiation with laser light.

In a next step, at least one second layer 20 of the plurality of layers is arranged on the surface of first layer 22. Then, first layer 22 and the at least one second layer 20 are laminated to form substrate 1. Embossed pattern 4 is embossed in an outer surface of an outermost layer of the at least one second layer 20. The embossed pattern 4 overlaps laser-engravable material 6 when viewed in a direction perpendicular to the surface of first layer 22.

In an example embodiment, and perhaps preferably, the embossing is performed in the step of laminating first layer 22 and the at least one second layer 20. Here, it will be appreciated that appropriately configured lamination plates can be used to perform the lamination such that, when the lamination process is performed, the material of the respective layers, in particular, the second layer 20, is heated, and the desired structures are embossed in the outer surface of the same in a known manner.

By combining laser-engravable material 6 and embossed pattern 4 with other features such as watermark 7 mentioned above, or further security features provided on additional layers, a security document 10 in accordance with the present disclosure can be readily obtained in an efficient manner.

In some embodiments, the method may further comprise a step of arranging at least one third layer such as the layers 24, 26 on a surface of first layer 22 opposite to the surface on which laser-engravable material 6 is applied. During lamination, first layer 22 and the at least one third layer 24, 26 are also laminated to form substrate 1, and a further embossed pattern 8 is embossed in an outer surface of an outermost layer of the at least one third layer 24, 26. The further embossed pattern 8 overlaps laser-engravable material 6 when viewed in the direction perpendicular to the surface of the first layer 22. Here, again, it may be preferred that the embossing is performed in the step of laminating the first layer 22 and the at least one third layer 24, 26 in the above-described manner.

After personalizable security document 10 has been manufactured, the same may be supplied to customers, where personalization of security document 10 can be performed in a known manner.

In particular when personalizable security document 10 includes embossed pattern 4 having a regular pattern 12 adapted to form a moiré pattern, a further secure feature can be obtained during manufacturing or personalizing of security document 10. Namely, a personalizable security document 10 including regular pattern 12 and, optionally, further regular pattern 14 can be provided. Then, a personalized image 5 can be laser-engraved in laser-engravable material 6 by varying one or more laser parameters. Here, it will be appreciated that the formation of further regular pattern 14 can be performed simultaneously with laser-engraving personalized image 5, or can be performed subsequently or prior to laser-engraving personalized image 5. For example, further regular pattern 154 may be formed during or after manufacturing of personalizable security document 10, and prior to personalization of the same. In some embodiments, the obtained moiré pattern can be configured such that personalized image 5 is visible when security document 10 is viewed from first side S1 under white light at a first observation angle, and is obscured at least in part when security document 10 is viewed from first side S1 under white light at a second observation angle. The use of moiré patterns to selectively display and hide or obscure one of the images forming the moiré pattern is well-known, such that a detailed description will be omitted herein.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although example embodiments of the present disclosure have been described herein, improvements and modifications may be incorporated without departing from the scope of the following claims.

The invention claimed is:

1. A personalizable security document comprising:

a substrate having a first side and a second side opposite to the first side in a thickness direction of the substrate; and a security feature formed in the substrate and extending through at least part of the substrate along the thickness direction;

wherein the security feature comprises:

a laser-engravable material configured to have a personalized image laser engraved therein, the laser-engravable material exhibiting a color-change effect upon irradiation with laser light, the laser-engravable material being embedded in the substrate and being visible when the substrate is viewed from the first side under white light;

an embossed pattern formed in an outer surface of the substrate on the first side, the embossed pattern overlapping the laser-engravable material and being visible when the substrate is viewed from the first side under white light; and a watermark provided in the substrate between the laser-engravable material and the second side, wherein the watermark is aligned with the embossed pattern, wherein the watermark is configured such that the watermark and the embossed pattern are visible when the substrate is viewed from the first side against transmitted white light, and wherein the laser-engravable material is configured such that when the personalized image is engraved therein, the personalized image is not visible when the substrate is viewed from the first side against transmitted white light.

2. The security document of claim 1, wherein an appearance of the embossed pattern changes when the substrate is viewed from the first side under white light at different observation angles.

3. The security document of claim 2, wherein the change in appearance comprises at least one of a change in color, a change in opacity, a change in reflectivity, or a change in shape of the embossed pattern.

4. The security document of claim 1, wherein the watermark and the embossed pattern are visible when the substrate is viewed from the second side against transmitted white light.

5. The security document of claim 1, wherein an appearance of the embossed pattern changes when the embossed pattern is viewed from the first side against transmitted white light at different observation angles.

6. The security document of claim 1, wherein the embossed pattern comprises a first regular pattern adapted to form a moiré pattern in combination with a second regular pattern.

7. The security document of claim 6, wherein the first regular pattern comprises a plurality of equidistant lines.

8. The security document of claim 7, wherein the first regular pattern comprises a plurality of straight lines being substantially orthogonal to opposite edges of the substrate when viewed from the first side, and wherein a distance between the plurality of straight lines is between 5 μm and 50 μm, inclusive.

9. The security document of claim 7, wherein the first regular pattern comprises a plurality of straight lines extending at an angle with respect to opposite edges of the substrate when viewed from the first side, and wherein a distance between the plurality of straight lines is between 5 μm and 50 μm, inclusive.

10. The security document of claim 1, wherein the embossed pattern is a first embossed pattern, and the security feature further comprises a second embossed pattern formed in an outer surface of the substrate on the second side, the second embossed pattern overlapping the laser-engravable material and being visible when the substrate is viewed from the second side under white light.

11. The security document of claim 1, wherein the laser-engravable material comprises metallic particles.

12. The security document of claim 1, wherein the substrate is formed by a plurality of laminated layers, the laser-engravable material being provided on an inner layer of the substrate and the embossed pattern being embossed in an outer layer of the substrate on the first side.

13. A personalizable security document comprising:

a substrate having a first side and a second side opposite to the first side in a thickness direction of the substrate; and a security feature formed in the substrate and extending through at least part of the substrate along the thickness direction;

wherein the security feature comprises:

a laser-engravable material configured to have a personalized image laser engraved therein, the laser-engravable material exhibiting a color-change effect upon irradiation with laser light, the laser-engravable material being embedded in the substrate and being visible when the substrate is viewed from the first side under white light; and an embossed pattern formed in an outer surface of the substrate on the first side, the embossed pattern overlapping the laser-engravable material and being visible when the substrate is viewed from the first side under white light; and wherein the embossed pattern comprises a first regular pattern and the laser-engravable material comprises a second regular pattern, and wherein the first regular pattern and the second regular pattern, in combination, form a moiré pattern.

14. The security document of claim 13, wherein the first regular pattern comprises a plurality of equidistant lines and the laser-engravable material comprises the second regular pattern by including a plurality of gaps or slots defining the second regular pattern.

15. A personalizable security document comprising:

a substrate having a first side and a second side opposite to the first side in a thickness direction of the substrate; and a security feature formed in the substrate and extending through at least part of the substrate along the thickness direction;

wherein the security feature comprises:

a laser-engravable material configured to have a personalized image laser engraved therein, the laser-engravable material exhibiting a color-change effect upon irradiation with laser light, the laser-engravable material being embedded in the substrate and being visible when the substrate is viewed from the first side under white light;

a first embossed pattern formed in an outer surface of the substrate on the first side, the first embossed pattern overlapping the laser-engravable material and being visible when the substrate is viewed from the first side under white light; and a second embossed pattern formed in an outer surface of the substrate on the second side, the second embossed pattern overlapping the laser-engravable material and being visible when the substrate is viewed from the second side under white light;

wherein the first embossed pattern and the second embossed pattern form a moiré pattern when viewed against transmitted white light from at least one of the first side or the second side.

16. A method of personalizing a security document, the method comprising:

providing a personalizable security document in accordance with claim 1; and laser engraving a personalized image in the laser-engravable material by varying one or more laser parameters.

17. The method of claim 16, wherein a moiré pattern results in that the personalized image is visible when the security document is viewed from the first side under white light at a first observation angle and is obscured at least in part when the security document is viewed from the first side under white light at a second observation angle.

18. A method of personalizing a security document, the method comprising:

providing a personalizable security document in accordance with claim 13; and laser engraving a personalized image in the laser-engravable material by varying one or more laser parameters.

19. A method of personalizing a security document, the method comprising:

providing a personalizable security document in accordance with claim 15; and laser engraving a personalized image in the laser-engravable material by varying one or more laser parameters.

* * * * *